EXAMINER

June 23, 1970 — SHIGEKI YAMATO ET AL — 3,517,312

TELEPHONE AND TELEGRAPH SWITCHING SYSTEM UTILIZING A STATIONARY SATELLITE

Filed Feb. 23, 1967 — 6 Sheets-Sheet 1

INVENTORS
SHIGEKI YAMATO
TATSUKI WATANABE
NOBUHIKO SHIMASAKI
SHUNJI TASHIRO

BY Hopgood & Calimafde
ATTORNEYS

INVENTORS
SHIGEKI YAMATO
TATSUKI WATANABE
NOBUHIKO SHIMASAKI
SHUNJI TASHIRO
BY Hopgood & Calimafde
ATTORNEYS

INVENTORS
SHIGEKI YAMATO
TATSUKI WATANABE
BY NOBUHIKO SHIMASAKI
SHUNJI TASHIRO

Hopgood & Calimafde
ATTORNEYS

INVENTORS
SHIGEKI YAMATO
TATSUKI WATANABE
NOBUHIKO SHIMASAKI
SHUNJI TASHIRO
BY Hopgood & Calimafde
ATTORNEYS INVENTORS
SHIGEKI YAMATO
TATSUKI WATANABE
NOBUHIKO SHIMASAKI
SHUNJI TASHIRO
BY Hopgood & Calimafde
ATTORNEYS INVENTORS
SHIGEKI YAMATO
TATSUKI WATANABE
NOBUHIKO SHIMASAKI
SHUNJI TASHIRO
Hopgood & Calimafde
ATTORNEYS 3,517,312

TELEPHONE AND TELEGRAPH SWITCHING SYSTEM UTILIZING A STATIONARY SATELLITE

Shigeki Yamato, Tatsuki Watanabe, Nobuhiko Shimasaki, and Shunji Tashiro, Tokyo, Japan, assignors to Nippon Electric Company, Limited, Toyko, Japan, a corporation of Japan Filed Feb. 23, 1967, Ser. No. 617,882
Claims priority, application Japan, Feb. 23, 1966, 41/10,877
Int. Cl. H04b 7/20
U.S. Cl. 325—4 4 Claims

ABSTRACT OF THE DISCLOSURE

A telephone and telegraph switching system utilizing an artificial satellite relay station, and a plurality of earth stations. The relay station is equipped with transponders to which a plurality of frequency bands are assigned including a number of communication channels and control channels. Each earth station is provided with a transmitter modulator for transmitting communications and control information to be sent out into a specific idle channel and control channel respectively, the latter defining the idle path among the channels assigned to the originating or terminating earth stations; a receiving demodulator for extracting communication information and control information from the transponder; and a detector unit for detecting the origination of calls, the terminating earth stations and the termination of calls.

This invention relates to a telephone and telegraph exchange system and more particularly to a telephone and telegraph exchange system incorporating an artificial satellite as a relay station.

Heretofore, telephone switching systems of the foregoing type have utilized a limited number of communication channels provided by an artificial satellite as described in U.S. Pat. No. 3,110,773 filed Oct. 9, 1959. These channels have been assigned to all of the earth stations. When a call originates at an earth station, the station utilizes an idle channel within its assigned channels and notifies the terminating earth station of that call. The terminating earth station, upon finding an idle channel within the assigned channels, answers the originating earth station and the switching of the call is thereby accomplished.

However, in this type exchange system, each of the earth stations has facilities for simultaneously receiving all of the channel frequencies assigned to all of the other stations, thus disadvantageously requiring a vast number of receivers.

It has been proposed to eliminate this disadvantage, for example, in U.S. patent application S.N. 530,270 filed Feb. 28, 1966, by providing the artificial satellite with a transponder unit; the plurality of earth stations and central control station being located within the line of sight of the artificial satellite. The frequency bands assigned to the satellite, earth stations and central control station are divided into a plurality of communication channels, which if necessary, are further divided into a number of communication paths by time division. When a call is originated by an earth station subscriber, the central control station which has memorized the using status of the communication paths, assigns an idle path to the originating earth station and the terminating earth station to establish communication between the two stations.

Although this telephone and telegraph exchange system efficiently utilizes the channels provided by the artificial satellite, the necessity of the central control station and its control over the calls and communication paths raises problems in international cooperation, and hence reliability when the system is used internationally.

It is the object of this invention to minimize the number of receivers to be prepared in each earth station by providing separate paths for the control and ordinary communication information.

It is another object of this invention to provide a telephone and telegraph exchange system in which the central control station concept may be eliminated and the switching operation is performed independently and automatically among the numerous earth stations.

The above mentioned and other features and objects of this invention and the manner of attaining them will become more apparent and the invention itself will best be understood by reference to the following description of embodiments of the invention taken in conjunction with the accompanying drawings wherein:

FIGS. 6 to 10 are explanatory diagram views for the time division multiplex paths to be used for control data transmission, and the control data transmission terminal unit to control said multiplex paths, within which FIG. 6 shows the composition of the time division multiplex transmission paths for the control data (omitting the propagation time of the electro-magnetic wave).

FIG. 7 is the same as FIG. 6 but including the propagation time of the electro-magnetic wave.

FIG. 8 is for explaining the synchronizing method of the transmitting time channels.

FIG. 9 is a block diagram of the control data terminal unit for controlling the multiplex paths.

FIG. 10 is a block diagram of the details of one part of the control data unit.

Figures 1, 2:
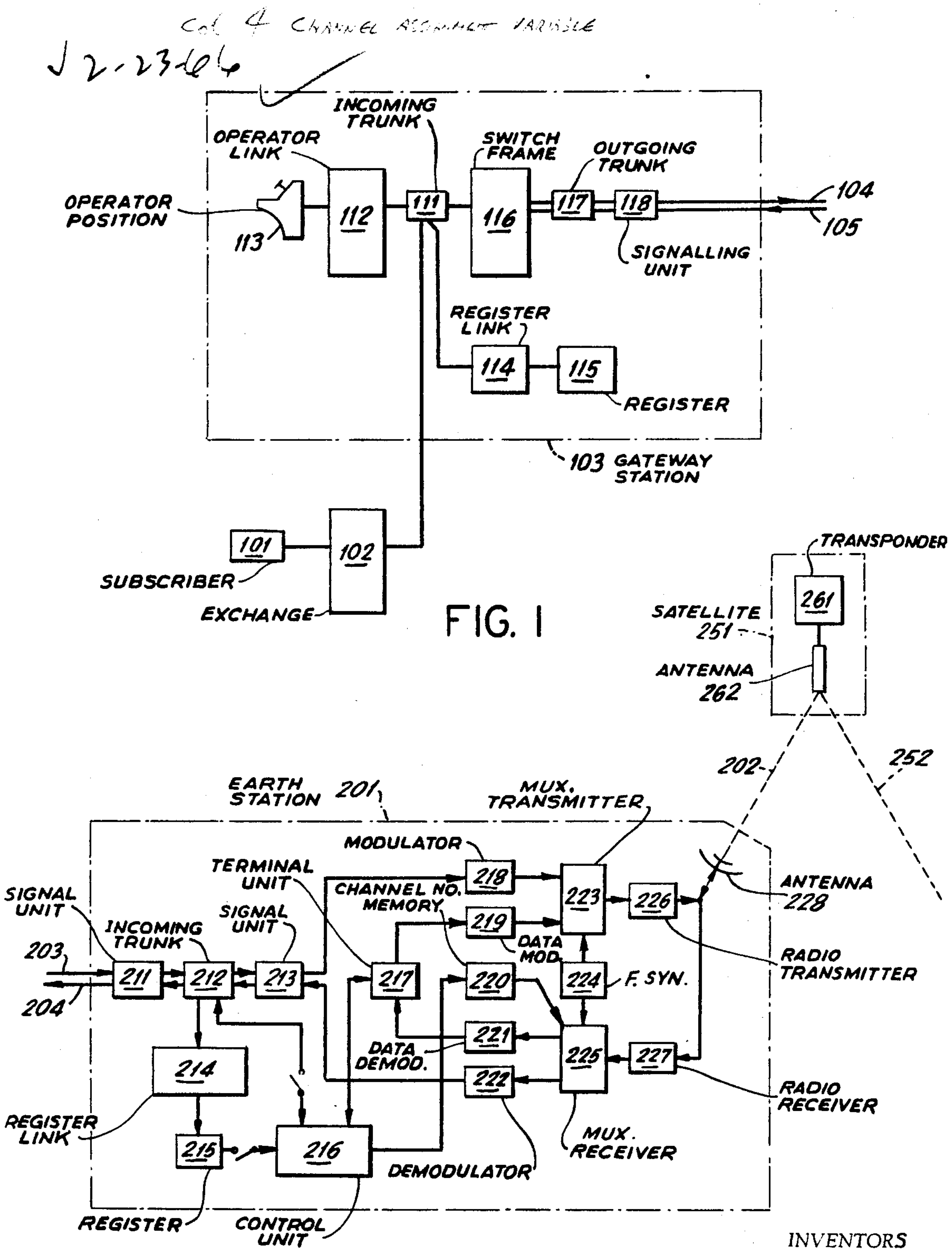
FIGS. 1, 2, 4 and 5 are block diagrams to be serially joined from left to right, illustrating an embodiment of the invention.

Referring now to FIGS. 1 to 5, it will be assumed for simplicity that the telephone exchange system uses a stationary satellite. In FIG. 1, a typical example of a domestic telephone network is shown; only the equipment necessary for an explanation of the invention is illustrated. These components and their inter-connections are all well known and do not constitute a part of this invention.

It is assumed that a subscriber (calling) 101 wants to call another subscriber (called) somewhere on the earth surface through the telephone exchange system of the invention. It is also assumed that the system is of the semiautomatic system type where an operator at an international switchboard relating to the calling party interrupts the connection. By dialing a predetermined number (the access code to the international board), the calling subscriber is thus connected through the domestic telephone exchange networks 102 to an incoming trunk 111 in the international gateway station (hereinafter, originating gateway station) 103, and through the operator link 112 to the international idle operator-position 113. The idle operator position 113 connects the line as required by the calling subscriber 101 by connecting the incoming trunk 111 through the register link 114 to an idle register 115 where the dialing information (the International and National Number of called subscriber and language digit) are dialed in and stored.

When the call is to be connected through the telephone exchange system according to the invention, the incoming trunk 111 is connected to a proper idle outgoing trunk 117 through a switch frame 116. The outgoing trunk 117 controls the signalling equipment 118 and thereby transmits a seizure signal on the inter-station trunk line 104 which informs the next switching point that a call has originated on the trunk line 104.

Referring to FIGS. 1 and 2, an earth station 201 (the originating earth station) has been connected with the originating gateway station 103 through the inter-station trunk line 104, and the call originating on the inter-station trunk line 104 constitutes an input to the exchange system. It is to be understood that the exchanges and connections as described above, starting from the calling subscriber 101, through the inter-station trunk line 104, to the originating earth station 201 are only exemplary and other type of exchanges and connections can also be made without changing the functioning of the exchange system according to this invention.

The first signalling equipment 211, at the originating earth station 201, detects the seizure signal from the former switching point or originating gateway station 103 and controls the incoming trunk 212 so that it is connected to an idle register 215 through a register link 214. Thereafter, the incoming trunk 212 commands the first signalling equipment 211 and causes it to send back a "proceed-to-send" signal to the inter-station trunk line 204. At the originating gate station 103, the signalling equipment 118 receiving this "proceed-to-send" signal controls the register 115 through the outgoing trunk 117 and the incoming trunk 111 so that the stored dialing information in the register 115 is sent out to the next switching point through the inter-station trunk line 104. At the originating earth station 201, the dialing information sent from the next switching point is received and stored in the register 215. The internal circuits of these equipments will not be detailed since they can easily be realized by familiar circuits of conventional telephone exchange systems. During the receiving and storing operations, when the register 215 receives information to identify a terminating earth station through which the call is to be transmitted, it controls the incoming trunk 212 through the register link 214 and supplies a predetermined amount of voltage to one of the control lines connecting this register 215 and a control unit 216. The controller 216 scans the voltage which appears on the control lines connected to each of the incoming trunks 212, and by means of the voltage and position of the control line knows the proper register 215 in the aforementioned operational state and also the equipment number of the incoming trunk on which the call arrives. It controls the register 215 through another control line connecting the controller 216 and the incoming trunk 212, the trunk 212 and the register link 214, and receives the dialing information already stored in register 215 through an information line also connecting the register and controller.

Figure 3:
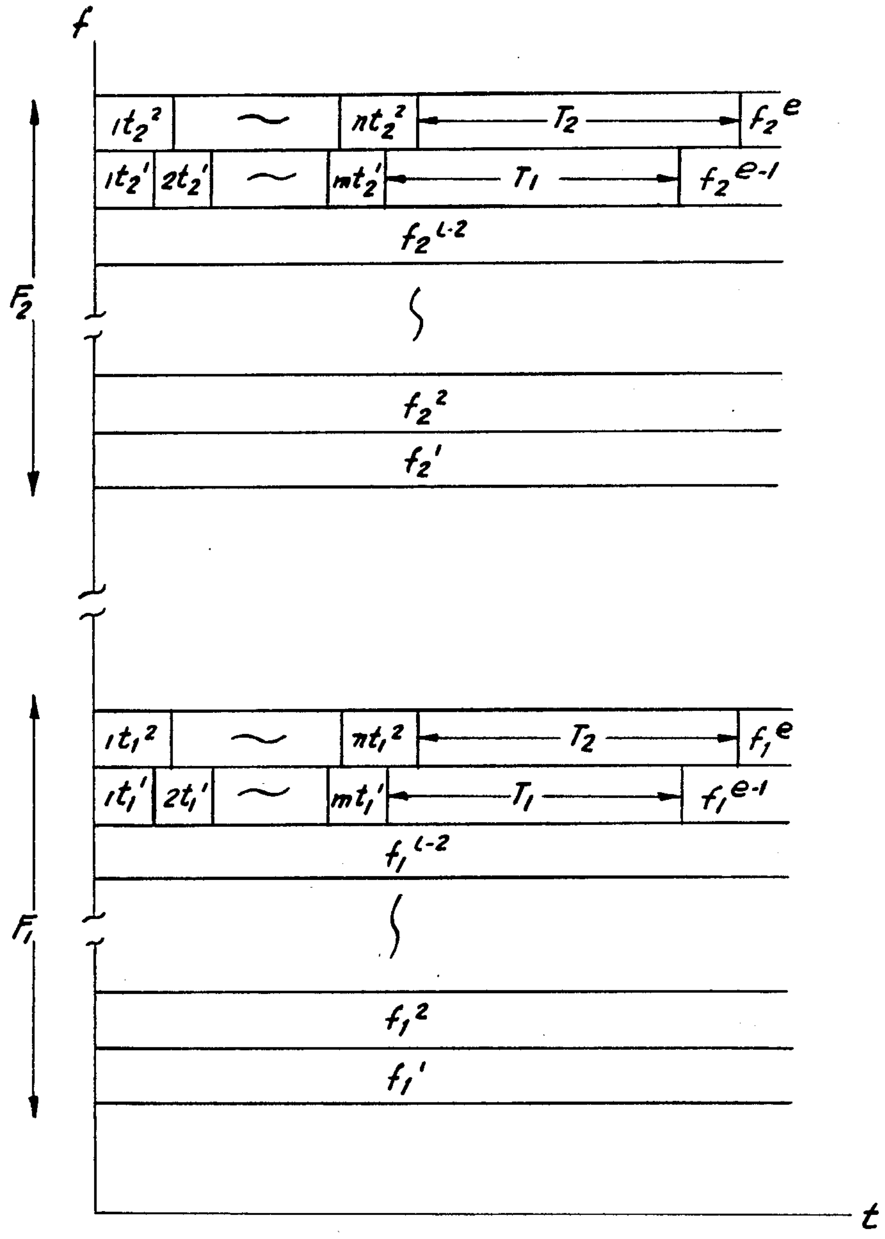
FIG. 3 is a frequency diagram to be used in explaining one inventive method of constituting a multiplex communication path through the satellite.

FIG. 3 is useful in explaining a typical embodiment of the invention where a number of wireless communication channels provided by a stationary satellite are utilized as a multitude of communication channels between each of the earth stations. In FIG. 2, a satellite 251 has a transponder 261 and an antenna 262. When the transponder receives a signal included in the $F_2$ frequency band (for example, 6000 megacycle band with 120 megacycle band width), the transponder converts this signal into another signal in the $F_1$ band (for instance, 4000 megacycles with a band width of 120 megacycles) and thereafter power amplifies this signal and transmits it through antenna 262.

In FIG. 3, the ordinate $f$ represents frequency and the abscissa the time. The frequency bands $F_1$ and $F_2$ are, respectively, divided into $f_1^1, f_1^2 \ldots f_1^e, f_2^1, f_2^2 \ldots f_2^3$ and the channels are provided respectively for each one way path through the satellite. As opposed to ordinary situations where the frequency division multiplex is established between each pair of stations and their channel widths may be vary narrow (for telephone, from 3000 to 4000 c.p.s.), the channel widths in this case must be comparatively wider (for telephone, about 200 kc.) because the channels are utilized in common by many earth stations and possible quality degradation due to inter-modulation must be compensated. In order to utilize these frequency and time ranges more effectively, conventional concepts of time division multiplex are applicable. When the information to be transmitted is of the digital type, the superiority of this method is evident. In the example shown here, the $(e-1)$th frequency division channel is divided into $m$ time-slots; $1t^1, 2t^1 \ldots mt^1$; having a frame repetition period $T^1$, and the $(e)$th channel is divided into $n$ time-slots; $1t^2, 2t^2 \ldots nt^2$; having a frame repetition period $T^2$.

According to the invention, the frequency bands $F_2$ and $F_1$ are divided into halves not corresponding to each other ($f_2^i$, $f_1^j$, $i \neq j$) and allocated to each of the earth stations according to the amount of traffic through the earth station, and the rest of the channels are variably assigned to these earth stations temporarily according to the communication demand of these stations; each of the earth stations is also so composed that they can comply with above-described allocations of the channels. That is, it is assumed that each of the frequency bands; $f_2^1, f_2^2 \ldots f_2^e$; within frequency band $F_2$ has been allocated to each of the earth stations according to the amount of traffic passing through the station. It is also assumed that each of the frequency bands $f_1^1, f_1^2 \ldots f_1^e$; within frequency band $F_1$ is variably assigned to each of the earth stations according to their communication demand. Thus, at the originating earth stations channels $f_2^i$ are allocated, and the channels $f_1^i$ are variably allocated to the terminating earth stations in accordance with the requests from the originating earth stations.

Returning to FIG. 2, in addition to the incoming trunk number and the radio frequency band number $f_2^i$, previously allocated to the modulator 218, the controller 216 supplements the dialing information, the station number of the originating earth station and an identification "newly arrived call," and arranges this information in a predetermined format (called a request for "channel-assignment") to pass on to the control data terminal unit or originating data terminal 217. The originating data terminal 217 functions to add redundant digits to the channel assignment request of the control unit 216 for the purpose of eliminating transmission errors and to store the information for the re-transmission request, from the next switching point. The information thus processed (called control information) is converted by means of a data modulator 219, multiplex transmitting unit 223 and a radio transmitter 226 to a signal to be transmitted in one of the many channels provided by the satellite and previously allocated for the purpose when the originating data terminal 217 sent afore-mentioned "control data" to the control data terminal unit in the terminating earth station, and the signal transmitted from the antenna 228 over space trunk 202. On the other hand, the control unit 216 controls the incoming trunk 212 through a connected control line, and causes it to send out a seizure signal from the second signaling unit 213, simultaneously giving to register 215 information pertaining to the digit number of the dialing information to be sent to the terminatnig gateway station.

If the terminating gateway station is in the same country as the called subscriber, the national digit for the receiving country is useless at the terminating gateway station. The apparatus required for judging this condition can be easily realized by ordinary translating circuits.

The seizure signal issued from the second signaling unit 213 modulates an intermediate frequency at modulator 218, and this is converted to a carrier wave having the frequency $f_2^i$, which has been previously allocated to modulator 218, at multiplex transmitting unit 223 and radio transmitter 226 and is transmitted from the antenna 228 through the space trunk 208 to the satellite 251. The frequency is converted to $f_1^i$ in the satellite 251 and sent back to the earth station 401 (hereafter called the terminating earth station) through another space trunk 252.

Figure 4:
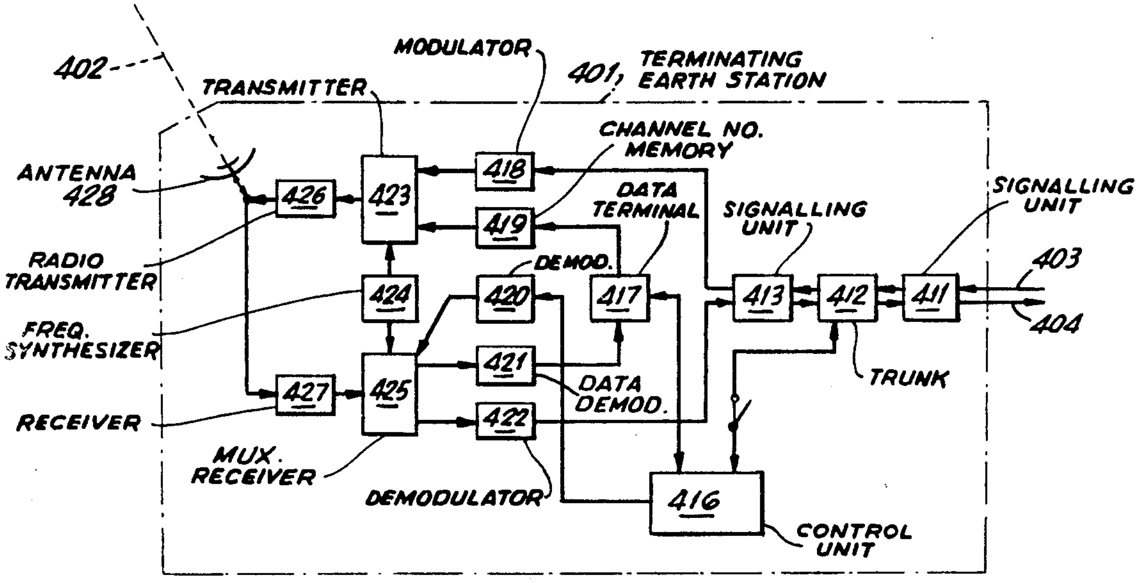

Referring to FIGS. 2 and 4, the control data sent out from the originating data terminal 217 through the data modulator 219, the multiplex transmitting unit 223, the radio transmitter 226 and the antenna 228 onto the space trunk 202, is then relayed by the transponder 261 and the antenna 262 of the artificial satellite 251 and sent back through space trunk 402 to the terminating earth station 401. The control data is then received by the antenna 428 in the terminating earth station 401, passes through the multiplex receiver 425, and is demodulated by the data demodulator 421. The control data is then given to a control data terminal unit or data terminal 417. Data terminal 417 is the same type equipment as the originating data terminal 217, and checks the existence of errors by means of the redundant signal contained in the control data. If an error is found, a control signal including re-transmission request is sent to the originating data terminal 217 through the predetermined path for sending the control data from the data terminal 417 to the originating data terminal 217 (as in the ordinary case) and if no errors are found, the data terminal 417 removes the redundant digits from the control data and the resultant channel-assignment-request signal is sent to the control unit 416.

The control unit 416 reads the channel-assignment-request signal and learns of its existence and controls an idle outgoing trunk 412 so that the modulator 418 and the demodulator 422 are further connected directly to the interstation trunk lines 403 and 404, and at the same time the control unit gives an assigned channel number to a channel number memory unit 420 connected with the outgoing trunk 412. The channel number memory unit 420 may consist of well known relays or flip-flop circuits. Channel number memory unit 420 controls the multiplex receiving unit 425 connected thereto according to the stored information.

Each frequency band in afore-mentioned frequency band $F_1$ (4000 mc. band) is first received through antenna 428 by a receiving unit 427, and then converted to a first intermediate frequency band (for example, 115 mc. band). This frequency conversion is easily realized by an ordinary heterodyne system and a mixer circuit. The first intermediate frequency band (115 mc. band) is then converted to the second intermediate frequency (for instance 10.7 mc.) by a multiplex receiving unit 425 utilizing the same method as described above. Thus, the channel number memory unit 420 suitably combines a plurality of different local oscillating frequencies generated from a frequency synthesizing unit 424 according to the assigned channel number and feeds it to the multiplex receiving unit 425. The receiving unit 425 extracts a signal from a carrier wave of the first intermediate frequency band (115 mc. band) corresponding to the frequency $f_1^i$. The signal is converted to the second intermediate frequency (10.7 mc. band), and is thereafter fed to a demodulator 422. That is, the variable frequency heterodyne receiver comprises a frequency synthesizer unit 424 (which is in itself a local oscillator), a multiplex receiver unit 425 (which is in itself a mixer) and a channel number memory unit 420 which connects both of said two units in accordance with the assigned channel number.

The seizure signal issuing from the originating earth station 201 is thus received at the terminating earth station through an antenna 428 and a receiving unit 427, and is separated as described above from the carrier wave $f_1^i$ by means of the multiplex receiving unit 425, the frequency synthesizer 424 and the channel number memory unit 420. It is thereafter demodulated by the demodulator 422, detected by the second signaling unit 413, and sent over the interstation trunk line 404 through the outgoing trunk 412.

Referring to FIG. 2 together with FIG. 4, the control unit 416 in the terminating earth station 401 operates similarly to the control unit 216 in the originating earth station 201, namely, the control unit 416 arranges the channel number of the channel $f_2^j$ which has been assigned to the modulator 418 corresponding to the outgoing trunk 412; the equipment number of the incoming trunk 212 in the originating earth station 201; the number of the originating earth station 201; the number of the receiving earth station; and an identification for the answer to the "channel assignment request" in a predetermined format (hereinafter referred to as channel assignment answer), and forwards it to the terminating data terminal 417. The terminating data terminal 417 sends a signal representing the "channel assignment answer" to the control unit 216 through the data modulator 419, multiplex transmitting unit 423, radio transmitter 426, antenna 428 (and an assigned communicational path for this purpose and the satellite 251), and through the antenna 228 of the originating earth station 201, radio receiver 227, multiplex receiving unit 225, data demodulator 221 and the originating data terminal 217. The control unit 216 controls the indicated incoming trunk 212, and causes demodulator 222 connected with this incoming trunk 212 to directly connect with the inter-station trunk line 204 and at the same time gives the assigned channel number (corresponding to $f_1^j$) to the assigned channel number memory unit 220 connected with indicated incoming trunk 212.

Figure 5:
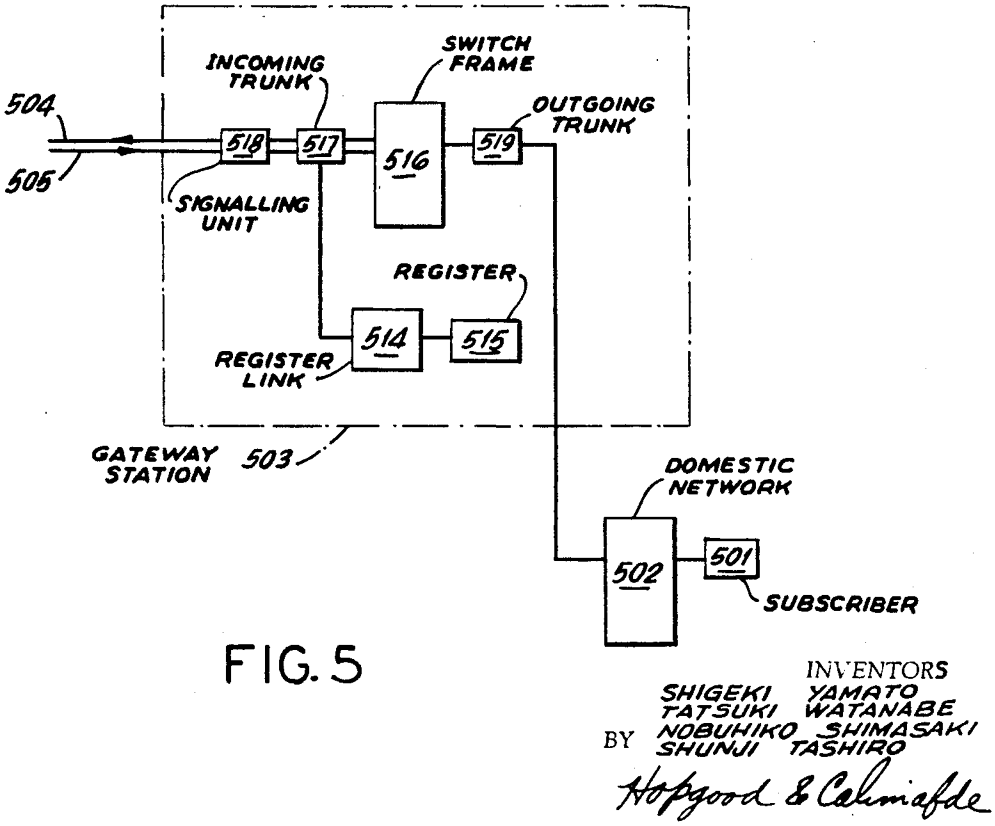

Referring to FIGS. 2 and 4 together with FIGS. 5 and 1, the seizure signal issued from the second signalling unit 213 in the originating earth station 201 and now arriving onto the inter-station trunk line 404 (connecting the terminating earth station 401 and the terminating gateway station 503) is detected by the signalling unit 518 and activates the incoming trunk 517. The incoming trunk 517 seizes one idle register 515 through the register link 514 and thereafter causes the signalling unit 518 to send out a "proceed-to-send" signal. The "proceed-to-send" signal arrives the terminating earth station 401 through the inter-station trunk line 504 and is detected by the first signalling unit 411. It simultaneously passes through the outgoing trunk 412, modulates the second carrier wave $f_2^j$ in the modulator 418, multiplex transmitting unit 423 and radio transmitter 426, and is sent out to the space trunk 402 through an antenna 428. The signal is converted by the artificial satellite 251 to another frequency $f_1^j$, and is sent back to the originating earth station 201 where the signal is demodulated by the demodulator 222 and detected by the second signalling unit 213.

Thus, the telephone exchange system in accordance with the present invention provides four wire speech paths between the incoming trunk 212 in the originating earth station 201 and the incoming trunk 517 of the terminating gateway station 503. Thus when the second signalling unit 213 in the originating earth station 201 detects the "proceed-to-send" signal from the terminating gateway station 503, the second signalling equipment 213 controls the register 215 through the register link 214 and the incoming trunk 212 so that register 215 sends out the stored numerical informations (describing the called subscriber) to the register 515 in the terminating gateway station 503 through the speech paths and then resets itself.

According to conventional telephone exchange system practices, the incoming trunk 517 is connected through the switch frame 516 with the outgoing trunk 519 which in turn is connected with the called subscriber 501 through the domestic telephone network 502 of the terminating country. When the called subscriber answers to the call, the response is fed back through the domestic telephone network 502 and detected by the incoming trunk 517 in the terminating gateway station 503. The signalling unit 518 forwards this response back through the established speech path to the second signalling unit 213 in the originating earth station 201 and in turn sends the response back through the first signalling unit 211, the inter-station trunk line 204, the signalling unit 118 in the originating gateway station 103, the outgoing trunk 117, the switch frame 116, the incoming trunk 111, operator position link 112, to the operator position 113 where the answer is indicated to the operator in any conventional way, such as lighting an indicator lamp. At this time, a speech path is established between the operator and the called subscriber, and the operator talks with the called subscriber, confirms the correctness of the exchange, and thereafter connects the calling subscriber 101 with the newly established speech path leading to the called subscriber 501 by means of, for example, manual switches; the exchange operation thereby being completed. These latter operations are similar to conventional international telephone exchange services and do not constitute a part of this invention. During the progress of these exchanges, the operator in the originating gateway station can send a recall signal to request the appearance of an auxiliary operator in the terminating gateway station on the line. These and other operations, such as the transmission of a reset signal where the called subscriber has hung up, all are similar to ordinary international telephone operations. They are not directly related to this invention, except that the signals are relayed at the originating earth station 201. In other words, the contribution of the exchange system according to this invention is to establish a four-wire speech path between the originating and terminating gateway stations through the originating and terminating earth stations 201 and 401 and to select different idle channels assigned to transmitting sides of these stations by communicating control informations through the controlling channels. Any other operation, such as providing on the thus formed speech path with any other control information can be easily realized by ordinary telephone exchange techniques.

Referring again to FIG. 1, when the calling subscriber 101 has hung up the telephone, the connections in the domestic telephone networks 102 are generally disconnected from the switching points consecutively, and the incoming trunk 111 in the originating gateway station 103 detects this disconnection of the former switching positions, and indicates via an "off" lamp to the operator-position to connect the next switching positions. By operating a manual switch, the operator may transmit the reset signal to the incoming trunk 212 through the incoming trunk 111, the outgoing trunk 117 and the inter-station trunk line 104. At the same time, the equipment and connections in the originating gateway station 103 which were established for that call are all disconnected (except the outgoing trunk 117) to prepare for other calls. A clear-forward signal issued on the inter-station trunk line 104 would constitute an input causing the disconnections of the telephone exchange system according to this invention. The operations between the time when the calling subscriber 101 has hung up until the clear-forward signal is issued on the inter-station trunk line 104 are exemplary only, indicating a simple conventional case for purposes of explanation. The operation of the telephone exchange system according to this invention would not be affected, however, by any other ordinary practices for the same purpose.

Referring to FIGS. 1, 2, and 4, the clear-forward signal arrived on the inter-station trunk line 104 is detected by the first signalling equipment 211 in the originating earth station 201 and passed to the incoming trunk 212. The incoming trunk 212 controls the first signalling equipment 211 and issues a release-guard-signal back to the latter continuously. It simultaneously controls the second signalling equipment 213 to issue a clear-forward signal, and then gives a predetermined voltage to a select line of the pilot lines connecting the incoming trunk 212 with the controller 216. The controller 216 continuously scans all of these pilot lines and finds the particular incoming trunk 212 to be reset and its equipment number by means of the position of the pilot line on which the predetermined voltage appears. The controller 216, thus at first resets the channel-number storing circuit 220 connected with the incoming trunk 212 and resets the assigned channels to the demodulator 222 for this call; i.e., the reception of frequency $f_1^j$ is stopped. Control unit 216 then stops sending the carrier wave, of frequency band $f_2^i$, which has been assigned to the modulator 218 since it is advantageous, in order to reduce the mutual interference of the radio frequency bands and channel to stop carrier transmission when the speech stops. Control unit 216 thereafter commands the incoming trunk 212 to reset through the control line. Incoming trunk 212 first confirms the fact that the related apparatus in the originating gateway station 103 are all reset by the disappearance of the "reset" signal from the originating gateway station 103, indicating to the first signalling equipment 211 to stop sending back the release guard signal, and then reset itself.

On the other hand, the clear-forward signal issued by the second signalling equipment 213 in the terminating earth station 201 (prior to the cessation of transmission of the carrier wave of frequency $f_2^i$) is detected by the second signalling equipment 413 in the terminating earth station 301. The outgoing trunk 412 in the terminating earth station 401, thus, knows of the release of the call and indicates to the first signalling unit 411 to issue a clear-forward signal and at the same time furnishes a predetermined voltage on a particular pilot line connecting the trunk 412 to the controller 416. The controller 416 which is always scanning these pilot lines, finds the particular outgoing trunk 412 demanding to be reset (and its equipment number) by means of the position of the pilot line on which the predetermined voltage appears, and first resets the channel number memory circuit 420, resets the channel assigned for that call (i.e. the reception of the carrier wave of the frequency $f_1^i$ is stopped), and also stops the transmission of the carrier wave of frequency $f_2^j$, which has been assigned to the modulator 418. It thereafter commands that outgoing trunk 412 to reset through the control line. The outgoing trunk 412 thus stops transmission of the clear-forward signal to the next switching point or to the terminating gateway station 503 and resets itself.

Referring now to FIGS. 4 and 5, the clear-forward signal sent from the first signalling equipment 411 in the terminating earth station 401 is detected by the signalling unit 518 in the terminating gateway station 503 through the inter-station trunk line 404, and the incoming trunk 517 thereby learns of the reset of the former switching points, and actuates the signalling unit 518 to continuously send back the release-guard-signal and at the same time resets all of the connections inclusive of the switch frame 516, the outgoing trunk 519 and the domestic telephone network 502 in the terminating country. Trunk 517 thereafter learns of the completion of the reset of all the equipment and related equipment, to the call in the terminating earth station 401, through the disappearance of the clear-forward signal which arrives on the inter-station trunk line 404, and causes the signalling unit 518 to stop the release-guard-signal and reset itself.

These resetting operations for the next switching positions from the incoming trunk 517 in the terminating gateway station 503, are all exemplary and any other type of ordinary resetting operation can be utilized without influencing the exchange system according to this invention.

Referring now to FIGS. 1 to 5, for the case the connection cannot be obtained (for example, all of the outgoing trunks 519 in the terminating gateway station 503 are busy) the incoming trunk 517 operates the signalling equipment 518 to send back a busy signal. When the first signalling equipment 411, of the originating earth station 401, detects the busy signal from the gateway station, the outgoing trunk 412 operates the first signalling equipment 411 and causes it to send out a clear-forward signal which urges the next switching points to be reset, and at the same time operates the second signalling equipment 413 causing it to send back the busy signal and demanding the controller 416 be reset. Operations thereafter are the same as previously explained in the case where the call is reset from the originating earth station.

In the originating earth station 201, the incoming trunk 212 which has detected the clear-forward signal via the second signalling equipment 213, causes the first signalling equipment 211 to send out a busy signal and commands controller 216 to reset itself. The operation thereafter is again quite the same as previouesly explained for the case where the call is reset from the originating earth station and hence further explanations will be omitted.

The operations in the originating gateway station 103 are quite the same as in an ordinary telephone exchange and one example of these operations is outlined as follows. When a busy signal is detected by the signalling equipment 118, the outgointg trunk 117 and the switch frame 116 are reset and the incoming trunk 111 learns that the reset is caused by the busy signal from the next switching points, and notifies the operator position 113 to that effect, for example, by lighting an indicator lamp. The operator, then, tells the calling subscriber 101 to hang up the telephone and wait until the operator calls subscriber 101 again.

Referring to FIGS. 2 and 4, when the controller 416 in the terminating earth station 401 finds out that the speech paths of the kind demanded in the "channel-assignment-request" are all occupied by other calls, that is, when it is found that the outgoing trunks in the designated terminating earth station are all occupield, controller 416 arranges the equipment number of the incoming trunk which is included in the "channel-assignment-request" and an identification code indicating that the demanded connections cannot be established, into a predetermined information format and sends it back to the controller 216 in the terminating earth station 201 through the method described previously. The controller 216 operates the proper incoming trunk 212 which in turn operates the first signalling equipment 211 and sends back the busy signal. The operations thereafter of said incoming trunk 212 and the related equipment in the originating gateway station and also of the former switching points are similar to those already explained with respect to the busy signal.

In this embodiment, in order to simplify the explanation, it was assumed that a channel frequency was allocated to the modulator beforehand and that the allocation of a channel frequency to the demodulator was carried out at random only when it was demanded. However, this relation can be reversed without objection. It is also possible to allocate two radio frequency bands to the originating modulator and demodulator of an earth station, and to correspondingly allocate two radio frequency bands at random to the terminating demodulator and modulator in another earth station only when they are demanded.

When not allocating these radio frequency bands to the modulator, demodulator, or the modulator-demodulator beforehand, but rather allocating each of a different group of radio frequency bands to each earth station, each time a call is originated in an earth station, in accordance with a predetermined sequence, the channel frequencies allocated to the earth station are assigned to its own modulator, demodulator or the modulator-demodulator. In other words, it is apparent that one or two radio frequency bands within a group of radio frequency bands allocated to each earth station are not permanently assigned to the modulator, demodulator or the modulator-demodulator of the particular earth station, but each time a call is originated, they may be assigned temporarily. In this case, the radio frequency band can be selected from a group of radio frequency bands allocated to the originating earth earth station or from the group of radio frequency bands allocated to the terminating earth station or from both of the frequency groups of frequency bands allocated to these two stations. When the frequencies are chosen from both of the groups of frequency bands allocated to the originating and terminating earth stations as described above, the frequency band can be utilized very effectively.

With respect to this selecting process for the radio frequency band, the controller in the originating earth station, in the same manner as described above, knowing the origination of a connection demand for a call and its destined country code number, first selects a pair of idle radio frequency bands $(f_2^i, f_1^j)$ within the group of radio frequency bands allocated to its own station, and as set forth before, adds the equipment number of the incoming trunk and the number for this radio frequency band pair $(f_2^i, f_1^j)$ to the dialing number of the destination, the station number of the originating earth station and an identification code indicating that the call is a newly originated call. It arranges these numbers in a predetermined information format, sends this "request for channel assignment information" through the originating data terminal to the terminating earth station.

The difference between the operation in the originating earth station and the operation previously described resides in the following two points; the radio frequency bands were permanently assigned to the modulator and temporarily assigned to the demodulator through the multiplex receiving unit and the channel number memory unit in the previously described embodiment, but in this case, the radio frequency band must be assigned temporarily to both of the modulator and demodulator units. The other point of difference is that because the radio frequency band is in this case allocated not to the modulator but permanently to the earth station, at each time when a connection demand is originated, it is necessary for a suitable radio frequency band pair to be selected from the group of radio frequency bands permanently allocated to the earth station and a memory unit must be provided to memorize the busy or idle status of these radio frequency pairs. However, it is apparent that the former can be easily realized by utilizing the same method as described in the above-mentioned embodiment as to the demodulator, and the latter can be realized by utilizing conventional techniques to memorize the busy or idle status of the radio frequency band pairs by ordinary relay circuits or magnetic core memory units and to choose an idle radio frequency band pair in accordance with a predetermined sequence; furnishing the selected radio frequency band pair number to the channel number memory unit.

In the terminating station, upon receiving the above-mentioned "request of channel assignment information" and reading the contents, if an idle outgoing trunk is found by furnishing to the channel number memorizing unit the number of the radio frequency band pair $(f_2^i, f_1^j)$ corresponding to the radio frequency band pair $(f_2^j, f_1^i)$, the incoming trunk in the originating earth station and the outgoing trunk in the terminating earth station are connected through this radio frequency band pair. The operation thereafter is similar to those explained in the above described embodiment.

If when a connection demand arrives, an idle radio frequency band pair cannot be found in the group of radio frequency bands previously allocated to the originating earth station, the controller in the originating earth station adds to the dialling information the equipment number of the incoming trunk, an identification code to indicate that no idle radio frequency band pair is existing, the station number of the originating earth station and another identification code indicating a newly originated call, and arranges them into a predetermined format and sends this "request for channel assignment information" through the originating data terminal to the receiving earth station. The terminating earth station, upon receiving this "request" and reading the contents, and if an idle outgoing trunk exists in that station, selects an idle radio frequency band pair within the previously allocated group of radio frequency bands and while this selected pair is assigned to the idle outgoing trunk, at the same time adds the number of that radio frequency band pair to the originating earth station number, the incoming trunk number of the originating earth station, the receiving earth station number, and an identification code indicating that this information is the answer for the "channel assignment request" and arranges them into a predetermined information format and sends this "channel assignment answer" signal through the terminating data terminal to the originating earth station. The originating earth station assigns this radio frequency band pair to the incoming trunk, and thereby connects the said incoming trunk and outgoing trunk in the terminating earth station. The operation thereafter is similar to that described above.

When the controller in the terminating earth station finds that the outgoing trunks indicated by the "request for channel assignment information" are all busy, or that all of the radio frequency band pair groups allocated to the originating earth station and the terminating earth station are busy, then similarly to the above described embodiment, the controller adds an identification code indicating that the connection is not obtainable, to the equipment number of the incoming trunk of the originating earth station, and arranges these into an information format, sending it through the terminating data terminal to the originating earth station in the manner described for the other control informations. The operation thereafter is similar to that described above.

As mentioned above, the radio frequency bands are not previously allocated permanently to the modulator, demodulator or the modulator-demodulator, but allocated to each earth station as a radio frequency band group, and at each time a call demanding connection is originated, suitable radio frequency bands are selected, as described above, from the radio frequency band group allocated to the originating and terminating earth station. In this manner, the idle radio frequency bands can be selected from a wider range, and by providing a larger number of modulator-demodulator pairs than the number of allocated radio frequency band pairs to the particular earth station, then insofar as any idle modulator-demodulators are found in that station, the idle radio frequency band pairs allocated to the corresponding terminating earth station can be utilized regardless of the fact that the radio frequency bands allocated to the originating earth station are all occupied. The utilization of the radio frequency bands can thereby be elevated to a great extent.

For the purpose of simplifying the selecting operation of the radio frequency bands in an earth station, an arrangement can also be made in such a manner that the suitable radio frequency band pair is selected from the radio frequency band group allocated to only one of the originating or terminating earth stations, or as described above, some of the radio frequency band pairs is assigned to a modulator-demodulator unit permanently and other modulator-demodulators have no radio frequency bands assigned permanently; by these means, economization of equipment can be obtained.

Where the radio frequency bands are allocated to the modulator-demodulator or to the earth station as a group of frequency bands, it is not obligatory to fix these allocations permanently. When a variation in traffic distribution, due for example to the time of the day, is considered, more advantageous results can be obtained by changing this allocation with time and the radio frequency bands can be utilized still more efficiently. This can be easily realized by blocking or releasing the radio frequency bands depending upon necessity and through the cooperation of the earth stations.

For the purpose of generalizing the explanation, the gateway station and the earth seation constituting one part of the telephone and telegraph exchange system in accordance with this invention, were described as located in different places and connected by a domestic interstation trunk line, but if these stations are constructed in the same place, it is apparent that economization in the consolidation of both of the gateway station and earth station and saving of the time required for the exchange and connection are possible.

Since the earth stations would be constructed in areas of little radio interference and noise, the building must sometimes be located in an area of limited access and maintenance must be minimized. If this is the case, the equipment in the earth station shown in FIG. 2 can be divided at intermediate points between the second signalling unit 213 and the modulator unit 218, between the demodulator unit 222 and the controller unit 216 and between the originating data terminal unit 217 and the channel number memorizing unit 220, and the equipment at the left side of these intermediate points can be installed in the originating gateway station. The equipment at the leftside of the multiplex transmitting unit 223 and multiplex receiving unit 225 can also be separated out and installed in the originating gateway station.

It will be apparent that the distance between the controller unit 216 and the originating data terminal unit 217 and the channel number memorizing unit 220 may be connected by means of conventional data transmission paths, and the voice connection can also be easily realized by a conventional carrier system.

For simplicity, a detailed description of the control data terminals and the control data transmission paths was not undertaken. However, if time divided multiplex channels are utilized for the data transmission paths, the modulator-demodulator unit can be economically constructed. For this reason, the constitution of the time divided multiplex channels for the control data and the control data terminals connected with the thus formed paths will be explained in greater detail.

It is, of course, possible to use the frequency divided multiplex channels for the above described control data transmission paths and to thereby connect all of the earth stations distributed in the visible range from an artificial satellite in a fixed consolidated network. However, it is apparent that an arrangement to connect each of these earth station pairs through two fixed allocated frequencies for bi-directional communication is less economical than another method in which one or several frequencies are assigned to the transmitter of each of the earth stations, and the receivers in such earth stations are constructed so as to receive all of the control signals transmitted from all of the earth stations. However, even in the latter method, the below described deficiencies occur. That is, the control data transmission paths according to this method should be comparatively narrow frequency bands in view of the information quantities. However, due to doppler effect and other effects caused by the sway of the satellite, the guard ranges of the frequency bands must be taken considerably wider, and this causes equivalent loss in the frequency band ranges. With respect to the data modulator-demodulator unit, a low speed modulator-demodulator unit for the frequency divided multiplex channels is not necessarily much more economical than a high speed modulator-demodulator unit for the time divided multiplex channels, and the cost of a data modulator-demodulator employable for the control data frequency divided multiplex channels in each earth station increases in accordance with the number of the earth stations. Also with this method, control data is generally transmitted with starting code and the terminating code attached, and since the control data is received utilizing these codes at the receiving side, if a part or whole of the control data transmission is lost by reason of the noise bursts or the like, there is no assurance of the correct answer. Nevertheless, it is of course apparent that the present invention can be realized even with this method.

The above described deficiencies can be eliminated through the utilization of time divided multiplex channels as control data paths. Synchronization of these channels is an important problem and one of the simplest solutions to this problem is to utilize a synchronization signal transmitted from one of the control data terminals of earth stations. While to utilize one of the earth stations as a center of this synchronization control of the time divided multiplex channels would be considered contradictory with respect to the foregoing which intends to eliminate the central control station, this is different from the control of calls or channels in the central control station, and considering the fact that the reliability of this method can be looked upon in the same manner as the control of a relay station such as satellite, there is no real problem.

Referring now to FIGS. 6 to 10, the composition of the control data time divided multiplex channels and an embodiment of the control data terminal unit to be connected will be explained in greater detail.

Figure 6:
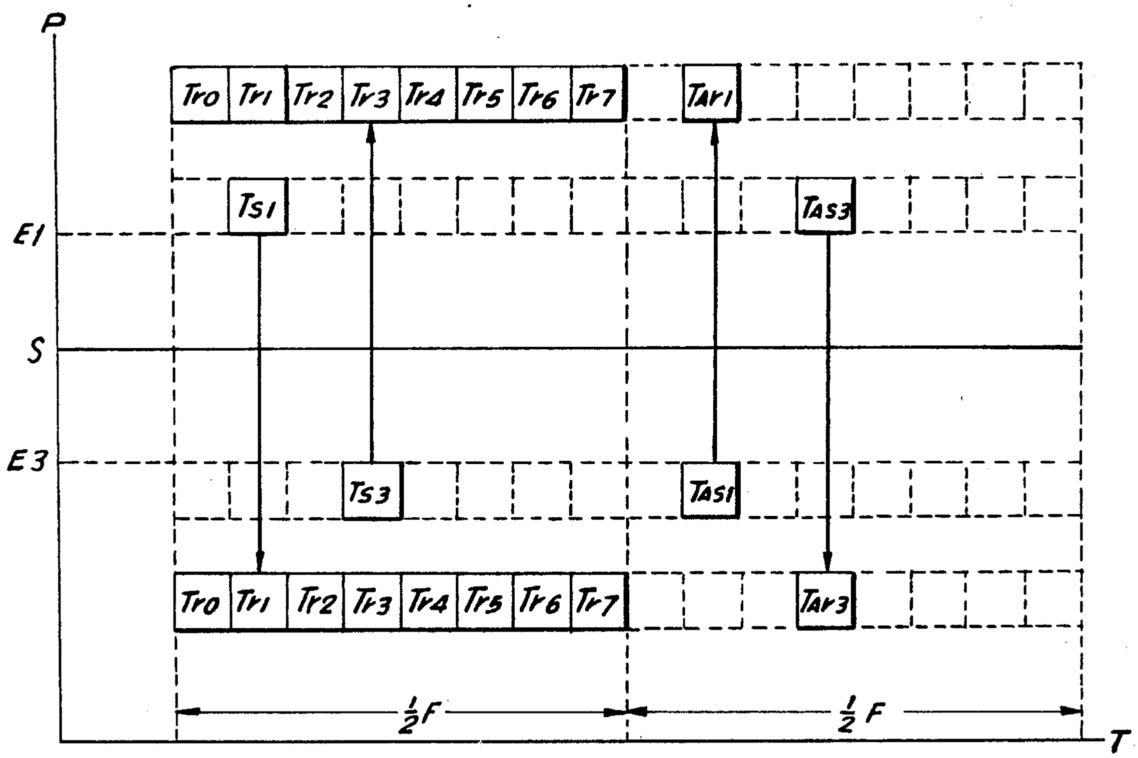

FIG. 6 shows the constitution of the time divided multiplex channels used for the control data, with time as the absissa and the position of the stations as the ordinate. The time required for the propagation of the electromagnetic wave is assumed zero for simplification.

A case will now be considered where 14 equally spaced time channels have been arranged in one frame length F of the time divided multiplex channel and a transmitting time channel $Ts_1$ and a receiving time channel $T_{Ar_1}$ within said time channels have been assigned to an earth station located at a position $E_1$ (hereinafter the earth station $E_1$) and a transmitting time channel $Ts_3$ and a receiving time channel $T_{Ar_3}$ have been assigned to another earth station located at a position $E_3$ (hereinafter the earth station $E_3$).

Generally errors in data communication occur with determinable probability (element error ratio from $10^{-4}$ to $10^{-6}$). Since an error in data communications can cause erroneous connections or other equally disruptive results, the function of detecting and correcting these errors is required in the invention. While many error controlling methods have hitherto been used, the consideration that a noise burst might occur during the transmission of control data suggests that the re-transmission demanding method which is now widely used as the most suitable by reason of its high transmission efficiency (the ratio of the redundant signals to the data signals is low). In the time divided multiplex channels composed as shown in FIG. 6, the re-transmission demanding method is performed advantageously as follows:

The earth station $E_1$, at a time position corresponding to the transmitting time channel $Ts_1$, sends out the above mentioned control data by first sending a carrier frequency, assigned to the control data time divided multiplex channels, to the stationary satellite at a location S. As explained before the control data includes station number of the destined earth station and a redundant signal to be used for detecting errors in accordance with a predetermined format. Each of the earth stations receives the control data arriving through the stationary satellite in the receiving time channels $Tr_0$, $Tr_1$ . . . $Tr_7$, and only when it judges that a particular control data has been received correctly and that the control data is destined to its own station does it proceed to process the data; other control data destined elsewhere is discarded without any further steps.

Now assuming that earth station $E_1$ transmits to earth station $E_3$ control data through a transmitting time channel $Ts_1$, then the earth station $E_3$ receives this control data in the receiving time channel $Tr_1$, finds its own station number in the control data, judges that the control data is destined to itself and proceeds as follows.

Earth station $E_3$ first adds an identification code (hereinafter referred to as "answer control data") indicating that the control data has been received in good condition to an answer signal corresponding to the control data, and sends back this "answer control data" signal to the earth station $E_1$ in an answer transmitting time channel $T_{As_1}$ located ½ frame length later than the transmitting time channel $Ts_1$. The earth station $E_1$ receives this "answer control data" in the already assigned receiving time channel $T_{Ar_1}$, and if it judges that the "answer control data" is correctly received by using the error detecting redundant signals included in it and also when the identification code indicating good receiving condition is found in the "answer control data," the earth station $E_1$ does not further retransmit the same control data and proceeds to send new control data in the same transmission time channel $Ts_1$. If the new control data is also destined to the earth station $E_3$, above procedures are simply repeated. However, if the new control data is destined to another earth station such as $E_7$ and if it is assumed that the control data is transmitted in the same transmitting time channel $Ts_1$, then the earth station $E_3$ judges that the control data is destined to another station, and takes no action to send out answer signal in the answer transmitting time channel $T_{As_1}$. Likewise, if the earth station $E_1$ has no control data to be transmitted, it repeats the transmission of a station number which has not yet been assigned to any earth station and some dummy control data, in the time channel $Ts_1$.

However, in other cases, for example, when the control data transmitted from the earth station $E_1$ in the time channel $Ts_1$ is erroneously received in the earth station $E_3$, the earth station $E_1$ has no answer signal received in the receiving time channel $T_{Ar_1}$, and proceeds to re-transmit the same control data in the transmitting time channel $Ts_1$. When the earth station $E_1$ transmits control data to the earth station $E_3$ in the time channel $Ts_1$ and the earth station $E_3$ receives this control data correctly, and sends back the "answer control data" to the earth station $E_1$ in the answer transmitting time channel $T_{As_1}$, if errors are included in this "answer control data" signals, the earth station $E_1$ transmits the previously sent control data again to the earth station $E_3$. At this time an identification code indicating that this is the retransmitted control data is attached to the previously sent control data so that the earth station is informed of the retransmission and the duplicated reception of the control data is thereby avoided.

Thus, by constituting the control data transmission in the time divided multiplex channels as described above, the assigned frequency band can be utilized efficiently and the data modulator-demodulator can be economically constructed with errors assuringly eliminated. For simplification of explanation, although the transmitting time channels $Ts_0$, $Ts_1$ . . . $Ts_7$ and the receiving time channels $Tr_0$, $Tr_1$ . . . $Tr_7$ are disposed in the front part of one frame, and the answer transmitting time channels $T_{As_0}$, $T_{As_1}$ . . . $T_{As_7}$ and answer receiving time channels $T_{Ar_0}$, $T_{Ar_1}$ . . . $T_{Ar_7}$ are disposed in the rear part of one frame, these may be arranged alternately in the front part and the rear of one frame. For instance, in the front part of the frame may be the transmitting time channels and the answer transmitting time channels may be alternately disposed, i.e., $Ts_0$, $T_{As_1}$, $Ts_2$, $T_{As_3}$, $Ts_4$, $T_{As_5}$, $Ts_6$, $T_{As_7}$ . . . and receiving time channels and answer receiving time channels arranged alternately i.e., $Tr_0$, $T_{Ar_1}$, $Tr_2$, $T_{Ar_3}$, $Tr_4$, $T_{Ar_5}$ . . . ; likewise the rear of the frame may be arranged $T_{As_0}$, $Ts_1$, $T_{As_2}$, $Ts_3$, $T_{As_4}$, $Ts_5$ . . . and $T_{Ar_0}$, $Tr_1$, $T_{Ar_2}$, $Tr_3$, $T_{Ar_4}$. In these arrangements when more than two time channels are required to be assigned to an earth station, two of the most separated time channels should be assigned to the earth station, and the mean waiting time for the time channels will thereby be minimized.

Figure 7:
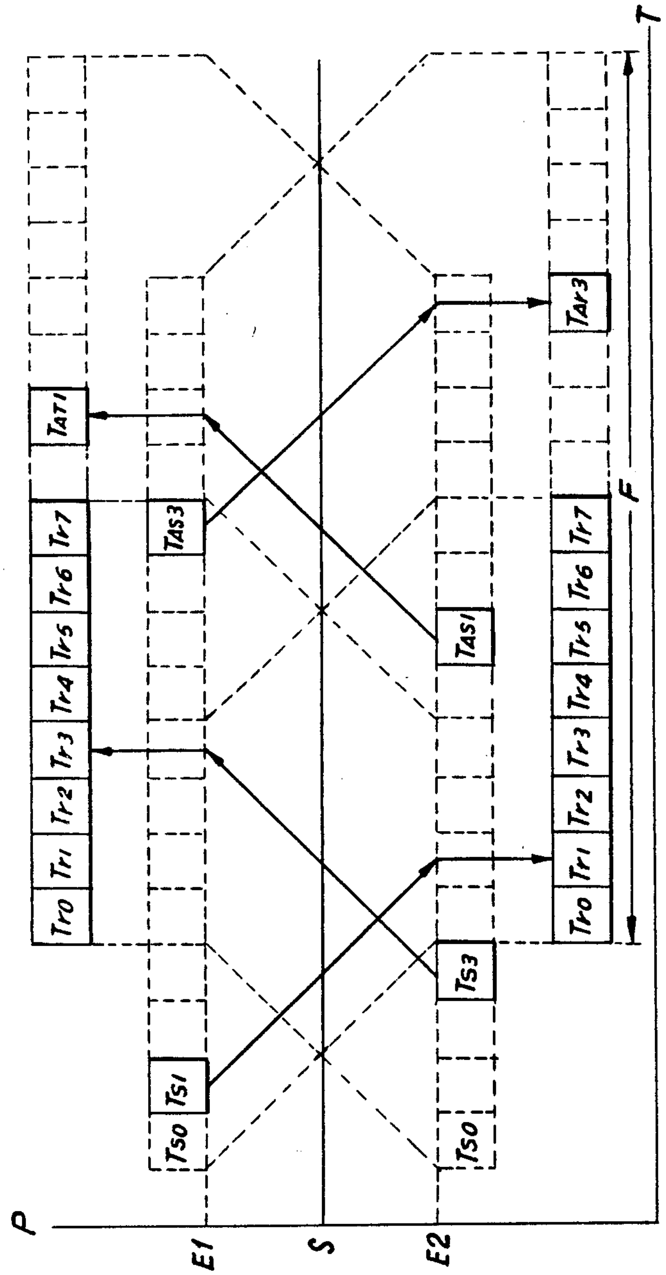

FIG. 7 illustrates the case where the constitution of the time channels shown in FIG. 6 is revised so that the time required for propagation of electro-magnetic wave is included. As will be easily understood from FIG. 7, if one frame length F is shorter than twice the required time for propagation (namely the round trip propagation delays) between any of two earth stations, the afore-mentioned $T_{Asi}$ and $Tsi$ slightly precede $Tri$ and $T_{Ari}$ respectively, and the transmission and reception of the control data and the "answer control data" cannot be performed smoothly. For this reason, if the round trip propagation delays of the electro-magnetic wave (when the relay station is a stationary satellite, these delays are about 270 ms.×2=540 ms.) and about 160 ms.×2=320 ms. of the control data processing time in the two earth stations are considered and also the synchronization for the conventional time divided synchronized telegraph system (the transmitting time of 1 word is 145⅚ ms.) is considered, it would be convenient to determine one frame length F as $$F=875 \text{ ms.}=145\tfrac{5}{6} \text{ ms.}\times 6>540 \text{ ms.}+320 \text{ ms.}$$

Continuing the reference to FIG. 7, the synchronization of the time divided multiplex transmission channels is performed as follows: At first, a frame synchronizing signal is sent out from an earth station through a time channel $Ts_0$ at the beginning of every frame, and the synchronization of the receiving time channels and the answer receiving time channels can be obtained by the reception of this synchronizing signal at all of other earth stations, even with satellite sway.

Figure 8:
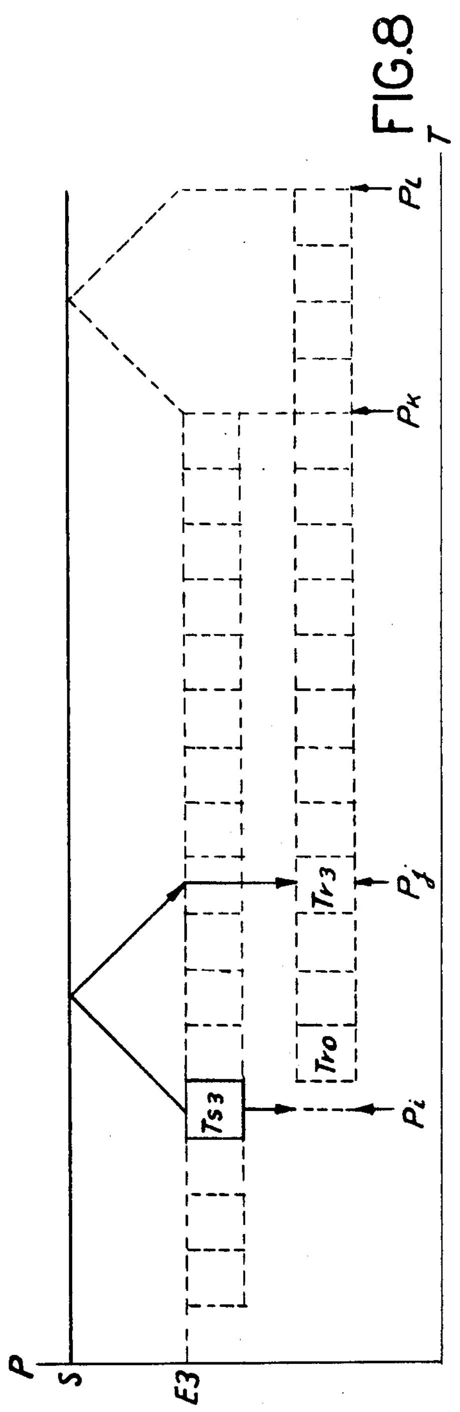

Referring to FIG. 8, a time channel diagram to be used for explaining the synchronization system of all of the transmitting time channels and the answer transmitting time channels is indicated. Now it is assumed that an earth station $E_3$ sends out a pattern data particular to its own station (hereinafter "time control data") in a transmitting time channel $Ts_3$, and terminates this transmission at a time position $Pi$, completes the reception of this "time control data" relayed by the stationary satellite at another time position $Pj$. Since the initiating time position $Pk$ of the transmitting time channel $Tso$ and the initiating time position $Pe$ of the receiving time channel $Tro$ are in the following relation:

$$Pe-Pk=Pj-Pi$$

hence, by using the relation; $Pk=Pe-Pj+Pi$ at the time position $Pj$, the transmitting time channel and the answer transmitting time channels can be maintained in a predetermined time relation vis-a-vis the receiving time channels and the answer receiving time channels even with relay satellite sway. This means that synchronization of the transmitting time channels and the answer transmitting time channels is thereby obtained.

When the sway of the relay station is small as in the case of a stationary satellite, the above mentioned transmission and reception of the "time control data" will be necessarily infrequent, but when the sway of the relay station is considerable, the "time control data" must be sent out each time in the transmission time channel together with the control data. At the time when this "time control data" is first sent out, if it can be previously known that the propagation time of the electro-magnetic wave falls within some range, the above mentioned signal interference at the relay station can be avoided by providing a suitable guard time between the two transmitting time channel groups. If the required propagation time of electro-magnetic wave cannot be previously known, this problem must be solved by either; (a) when the "time control data" is initially transmitted, all of the earth stations stop the transmission of other control signals, or (b) the "time control data" is transmitted by utilizing a carrier wave of another frequency.

Figure 9:
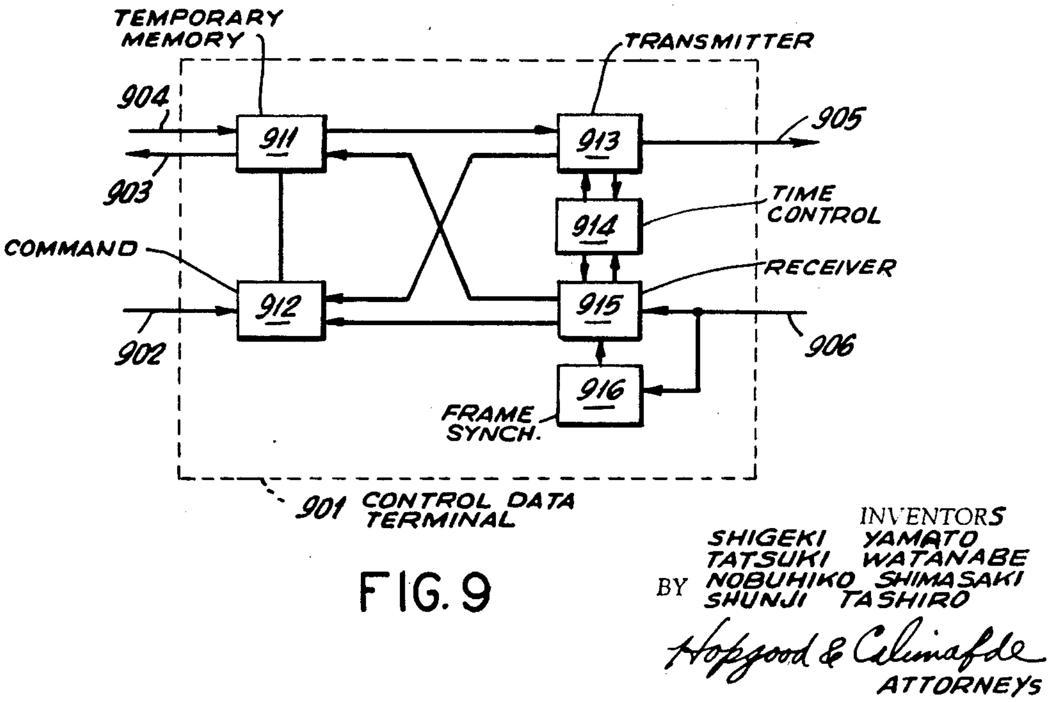

Referring to FIG. 9, the control data terminal 901 comprises a temporary memory unit 911, a command unit 912, a transmitting unit 913, a time control unit 914, a receiving unit 915 and a frame synchronizing unit 916, and constitutes the above mentioned arrangement for simultaneously controlling errors by way of the re-transmission method. After the transmission of the control data from the transmission terminal 901, the temporary memory unit 911 temporarily memorizes the control data until a signal indicating good reception arrives from the opposing station; or it temporarily memorizes the control data transmitted from the opposing station for a while after the reception, and assists the low speed operation of above mentioned control units 216 and 416. The temporary memory unit 911 may be realized by a conventional magnetic core memory such as used in electronic computers and electronic exchange systems. The command unit 912 is composed of an ordinary logic circuit and processes the write-in commands and read-out commands arriving from the control units 216, 416, transmitting unit 913 and receiving unit 915 so that the commands do not overlap in time. The command unit 912 also performs the logical operation of rewriting the status of the control data which is memorized in the temporary memory unit 911 together with the control data itself in the same manner as the usual retransmission demand method for the error control.

The transmitting unit 913 is composed of an ordinary counting circuit, a logical "OR" circuit, a logical "AND" circuit, an exclusive "OR" circuit, a flip-flop circuit etc., and performs parallel-series conversion of the control data, data transmission, addition of the error detecting redundant signals and the like. The time control unit 914, as already explained with reference to FIG. 8, synchronizes the transmission time channels and the answer transmitting time channels, and memorizes the numbers of the answer transmitting time channels as will be explained later in connection with FIG. 10. The receiving unit 915 has almost the same circuit composition as the transmitting unit 913 and performs the reception and the series-parallel conversion of the control data and also error detection by means of the redundant signal. The frame synchronizing unit 916 is composed in similar manner to those in ordinary PCM communication systems and has been described in detail, e.g. in an article "A synchronizing system in digital data transmission" by Inose, Takagi, and Imazu published in the magazine of The Institute of Telecommunication in Japan, Volume 48–8, August 1965, pages 1384 to 1393.

Figure 10:
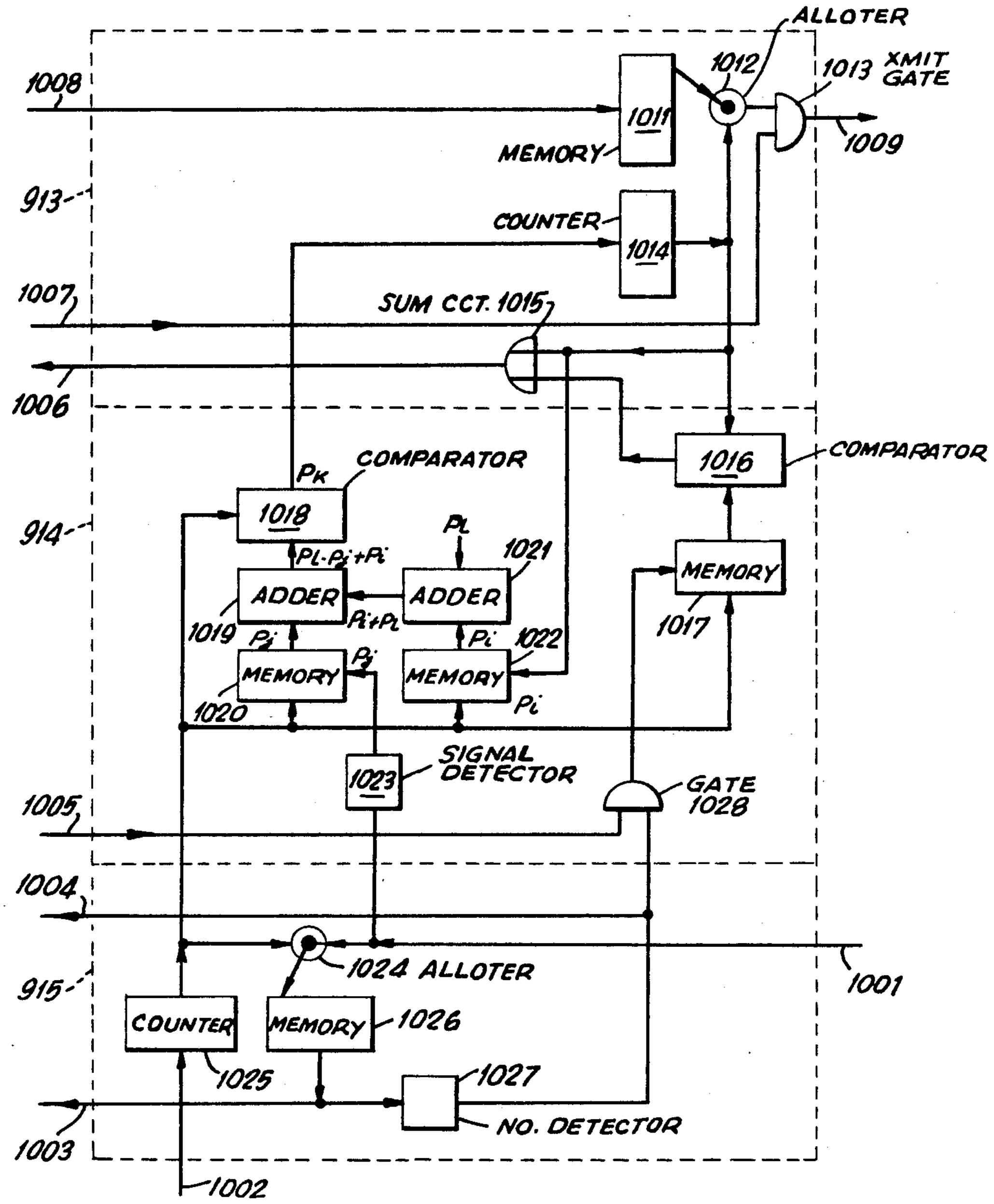

FIG. 10 shows in greater detail the time control unit 914, the transmitting unit 913 and the receiving unit 915. The control data is received through the control data input terminal 1001, and when the data reaches a receiving allotter 1024, the allotter 1024 being controlled by a receiving counter 1025 directs a temporary memory circuit 1026 to memorize the control data bit by bit timely in series. The receiving allotter 1024 consists of a logical product circuit, logical sum circuit and a decoder circuit which converts the output of the receiving counter circuit 1025 into a time pulse; this can easily be realized as will be appreciated by those skilled in the art. The receiving counter circuit 1025 is an ordinary binary counter and is maintained at its synchronized state by receiving a synchronizing signal from the synchronizing unit 916 via a synchronizing input terminal 1002. The receiving temporary memory 1026 is composed of flip-flop circuits. A station number detecting circuit 1027 scans the outputs of the receiving temporary memory 1026, and detects its own station number at a time channel and at a predetermined output position, and utilizing the error detecting redundant signal, it also performs, for instance, an ordinary horizontal and vertical parity checks by means of an ordinary exclusive OR circuit. When the station number detecting circuit 1027 judges that the control data received is correct, it issues receiving order to the commanding unit 912 through a receiving order output terminal 1004 and also opens the gate of a time channel memory circuit 1017. When the commanding unit 912 judges that the control data is to be received, the control data stored in the receiving temporary memory circuit 1026 is written into the temporary memory unit 911 through the control data output terminal 1003.

The first time channel memory circuit 1017 is composed of flip-flops, and when the gates of these flip-flops are opened by the station number detecting circuit 1027, memory circuit 1017 memorizes the receiving time channel number for $Tri$ indicated by the receiving counter 1025 at that instant. The first comparison circuit 1016 which may be composed of exclusive OR circuits continuously compares the number of the receiving time channel T*ri* temporarily stored in the first time channel memory circuit 1017 with the output of the transmitting counter circuit 1014, and at the time position where the transmitting counter circuit 1014, is counting the answer transmitting time channel TA*si*, it gives a transmission order to the commanding unit 912 through the logical sum circuit 1015 and the transmission order output terminal 1006.

A transmission allotter 1012 is controlled by the output of the transmitting counter circuit 1014 and transmits the control data, which has been read out from the temporary memory memory unit 911 and stored in the transmitting temporary memory circuit 1011, bit by bit timely in series. However, it must be remembered that this transmission really occurs through the control data transmisison terminal 1009 only when the commanding unit 912 judges that the control data concerned is to be transmitted and the transmitting gate 1013 is opened via the transmitting gate terminal 1007. In this manner, the ordinary control data and the answer control data are received in each of the stations. If the control data destined to its own station is received in more than two receiving time channels in one frame length period, the commanding unit 912 knowing this condition from the "status word" for the control data stored in the temporary memory unit 911, controls the gate 1028 via the gate terminal 1005 so that the answer control data is sent back not more than once in one frame period. Of course, if more than two of the above mentioned circuits are provided, it is possible to send back more than two answer control data in one frame length. When the transmitting counter circuit 1014 reaches the predetermined time position in the transmitting time channels, the transmission order is given to the commanding unit 912 via the logical sum circuit 1015 and the transmission order output terminal 1006. When the commanding unit 912 judges that the control data is to be transmitted in the particular transmitting time channel, it reads out the control data stored in the temporary memory unit 911 onto the transmitting temporary memory circuit 1011 via the control data input terminal 1008, and at the same time gives a signal "1" to the transmitting gate 1013 through the transmitting gate terminal 1007. The transmitting counter circuit 1014 controls the transmitting allotter 1012 and transmits the control data read out onto the temporary memory 1011.

Continuing with reference to FIG. 10, the circuit composition and operation of the synchronization circuit for the transmitting time channels with the answer transmitting time channels will now be explained (both of which were described with reference to FIG. 8). As already explained in connection with FIG. 8, when a time control signal which is particular to its own station is transmitted at a time position P*i* (though not shown in the figure), the binary pattern of the receiving counter circuit 1025 at the time position is stored in the second time channel memory circuit 1022 (this pattern is supposed to be P*i*). Then the time control signal is received through the control data receiving terminal 1001, the time control signal detecting circuit 1023 (composed of conventional shift registers and logical circuits) detects this signal, opens the gate of the third time channel memory circuit 1020, and stores the binary pattern (supposedly P*j*) of the receiving counter circuit 1025 at this time position. The first adder circuit 1021 adds the binary patterns P*i* and P*e*, the sum $Pi+Pe$ being given to the second adder 1019. The second adder circuit performs the addition of said $Pi+Pe$ and the inverted output P*j* of the third time channel memory circuit, and gives the resultant sum of $Pe-Pj+Pi$ to the second comparator circuit 1018. The second comparator circuit 1018 compares the resultant output $Pe-Pj+Pi$ with the output from the receiving counter circuit 1025, and at the time position when both of them coincide (namely at P*k* in FIG. 8), it resets the transmitting counter 1014 forcibly to the initial time position of the transmitting time channel. In this manner, synchronization of the transmitting time channel with the answer transmitting time channel can be obtained.

As is clear from the foregoing explanation, the telephone and telegraph exchange system of this invention composed as herein described and including a satellite station, can provide a perfectly star-like switching network having one link between the international gateway stations each connected with an earth station according to this invention, and also can provide a communication path between two points widely distributed on the earth's surface and connected through respective telephone networks with each of the earth stations located within sight of the satellite (in this case the stationary satellite covers the area of about ⅓ of whole surface of the earth).

The traffic between each of these gateway stations and the amount of calls sent out or received in the gateway stations are not considered on an individual basis, but rather from the total sum of the traffic between all of those gateway stations counting the local time differences. Hence, the equipment to have sufficient capacity to cope with peak traffic are; incoming and outgoing trunks leading to the earth stations, signalling equipment, terminals on the switch frames and the register in the gateway station; comparatively short inter-office trunk lines between the gateway station and the earth stations; the incoming and outgoing trunks, signalling equipment, the modulator-demodulator unit, the channel-assignment register unit, the frequency synthesizer, the multiplex transmitting and receiving units, registers in the earth station; and those equipments commonly used regardless of the peak traffic are the controller, control data terminal equipment, radio transmitter, radio receiver, antenna and those common for whole systems such as the relay station consisting of the satellite. Considering that the equipment and installations used in the gateway stations are all necsesary even where the gateway stations are connected with submarine cables or the like, it is clear that the telephone exchange system according to this invention can provide a much more economical and versatile system than those which have their gateway stations connected through a mesh-type network or semi-mesh-type network of costly long distance cables, especially where the required quantity of traffic through a cable is substantially less than the capacity of the cable.

Within the total number of channels furnished by the satellite, paths other than the control channels which are allocated for transmission of the control data between the equipment in the earth stations, are not assigned permanently between the particular pairs of earth stations, but are assigned to each earth station to be utilized for communication with the rest of the stations. Hence, when the substantial irregularities of these speech times and also the differences of the local standard time for those stations are considered, it will be easily understood that the required number of channels in this system is far less than in the above described case. Also in the telephone and telegraph exchange system in accordance with this invention, the control of calls and channels by the central control station is utterly eliminated and when the system is used in the international communication network, the above described difficulties such as the international common control of the system which is apt to cause political problems and the deterioration of the reliability of the network due to the central control of the system are all eliminated.

Furthermore, because of the elimination of the treatment in the central control station, the required time period for the connection of calls is significantly shortened. Also in the telephone and telegraph exchange system in accordance with this invention, there is no necessity in each of the earth stations to receive and supervise all of the channel frequencies used in the whole system; hence with provision of the separate channels for transmission of the control data, the number of the receiving equipment in each of the earth station can be minimized. Moreover, in accordance with this invention, the so-called selecting signals including the discrimination code for the destination (or the register signal), or the supervisory signal (or the line signal) or both of these signals can be transmitted and received through the control data transmission channels, and the advantageous features of the separate common channel system which is going to be adopted in the 6th international telecommunication branch of the international telephone and telegraph committee can be fully utilized.

Although the present invention has been described in conjunction with a preferred embodiment of the invention, it is apparent that many variations other than those disclosed above are possible without departing from the scope of the invention as defined in the accompanying claims.

What is claimed is:

1. A multi-access satellite communication system comprising a satellite relay station, and a plurality of earth stations located in the line-of-sight of the satellite relay station, said satellite relay station having a transponder in which the transmission communication capacity is divided into a plurality of communication channels assigned to the respective earth stations and a fewer number of control channels assigned to the respective earth stations;

each of said earth stations including a detector for detecting the origination of a demand for information communication and the terminating earth station to which said communication is to be transmitted, means for transmitting an address signal from the detector and a communication channel designation signal to said terminating station through the satellite relay station in one of the control channels, means for receiving another address signal and another communication channel designation signal transmitted from another earth station through the satellite relay station in another of the control channels assigned to said another earth station, means for storing data concerning the busy and idle status of the communication channels assigned said station;

processing means responsive to said address signal from the detector and to another address signal from another earth station for producing a communication channel designation signal on the basis of the content of said storing means, said communication channel designation signal specifying at least one of the communication channels assigned to said station, and means responsive to the designation signal from said processing means and to said another designation signal for communicating information with the terminating earth station through the satellite relay station in selected ones of the communication channels selected from a group comprising communication channels assigned to said station and communication channels assigned to said terminating earth station.

2. A multi-access satellite communication system according to claim 1, said transmission communication capacity of the transponder including time division multiplex communication channels having a frame length greater than four times the maximum transmission time period for an electromagnetic wave from any of said earth stations to reach said satellite relay station.

3. A multi-access satellite communication system according to claim 2, wherein said system comprises an arbitrarily changeably allocated answer time channel after a predetermined time from the time channels allocated to each of the earth stations, and means responsive to an earth station receiving the address signal destined to its own station in a previously allocated time channel for transmitting the answer through said answer time channel provided in correspondence with, and a predetermined time after, said time channel.

4. An earth station for use in a multi-access satellite communication system including a stationary satellite relay station including a transponder mounted therein, and a plurality of earth stations located in the service area of the satellite relay station, said transponder having its transmission communication capacity divided into a plurality of communication channels assigned to the respective earth stations and a fewer number of control channels assigned to the respective earth station;

said earth station comprising means responsive to a call from a subscriber in an associated exchange network to produce an address signal, means for storing data concerning the busy and idle status of the respective communication channels assigned to said static processing means responsive to the address signal for producing a communication channel designation signal on the basis of the data content in said storing means, said designation signal specifying at least one of the communication channels assigned to said station, means for transmitting said address signal to another earth station specified by said call through the satellite relay station in one of the control channels assigned thereto, and means responsive to the designation signal from said processing means and to another communication channel designation signal received from said another earth station through the satellite relay station in one of the control channels assigned thereto for setting transmission and reception means thereof for transmission and reception in those communication channels which are specified by said designation signal and by said another designation signal.

References Cited

UNITED STATES PATENTS

| | | | |
|---|---|---|---|
| 2,670,435 | 2/1954 | Mitchell | 325—55 |
| 2,946,044 | 7/1960 | Bolgiano et al. | 179—15 XR |
| 3,022,375 | 2/1962 | Davey | 178—53.1 |
| 3,141,928 | 7/1964 | Davey et al. | 325—55 XR |
| 3,173,996 | 3/1965 | Rypinski | 179—41 |
| 3,226,484 | 12/1965 | James | 179—15 |
| 3,292,178 | 12/1966 | Magnuski | 343—204 |
| 3,320,611 | 5/1967 | Sekimoto et al. | 325—4 |

ROBERT L. GRIFFIN, Primary Examiner

C. R. VON HELLENS, Assistant Examiner

U.S. Cl. X.R.

325—15, 55; 179—15